Nov. 21, 1939.　　　C. H. STEINBISS　　　2,180,647
FRUIT PITTING MACHINE
Filed Oct. 21, 1937　　　4 Sheets-Sheet 2

Inventor
Carl H. Steinbiss
By Strauch & Hoffman
Attorneys

Patented Nov. 21, 1939

2,180,647

UNITED STATES PATENT OFFICE 2,180,647

FRUIT PITTING MACHINE

Carl H. Steinbiss, San Francisco, Calif., assignor to Lyons-Magnus, Incorporated, San Francisco, Calif., a corporation of Delaware Application October 21, 1937, Serial No. 170,274

13 Claims. (Cl. 146—19)

The present invention relates to machines for removing the pits from cherries, plums and like fruits and for slicing said fruits, and more particularly to a novel continuously operated fruit pitting and/or slicing machine of the automatic or semi-automatic type.

Fruits such as cherries, plums and the like are preferably marketed with the pits removed. The removal of the pits has been a problem to the art since the sales appeal of the product depends upon whether the pits can be removed without marring the meat or the natural appearance of the fruit.

A number of methods have been proposed for removing pits from fruits of the type described such as cherries, the oldest method being by hand, whereby each cherry is picked up by hand and the pit is removed with the aid of a spoon. Cherries so pitted constitute a high class product but are very expensive due to the labor involved.

Machines have been proposed to remove the pits from cherries wherein the cherries are placed in a receptacle and pitting means operated by hand. This method is an improvement over the hand method as regards expense, but it still requires manual aid, is very tiresome, and is expensive by reason of the amount of manual labor involved.

Fully automatic machines have been proposed with a view to producing a product at minimum expense as compared to the cost of the product of hand pitting. Increased output however has been characterized by an inferior product due to the fact that the pitting tools employed enter the fruit at various points and remove the pits from the sides, bottoms and stem ends. As a consequence the outward appearance of the fruit is considerably altered. The general run of fruit pitted in such fully automatic machines accordingly is not acceptable when a high grade product is required.

In overcoming the aforesaid disadvantages of the prior art and in producing a product of excellent quality at a minimum expense, it is a primary object of my invention to provide a novel fruit pitting machine and/or slicing machine, the output of which approximates that of the automatic machines hitherto proposed, but the product of which is of high quality approaching that of the manually pitted fruit.

A further object of my invention resides in the provision of a continuously operating fruit pitting machine wherein the manual aid required is reduced to a minimum consistent with the production of an extremely high grade product.

Still a further object of my invention is to provide a fruit pitting and/or slicing machine having a moving fruit supporting conveyor with a fruit supply chamber arranged to travel with the conveyor, the latter chamber being maintained filled by suitable means.

A further object of the present invention resides in the provision of a novel fruit pitting and/or slicing machine having a plurality of rows of fruit receiving pockets with a corresponding number of filling stations for the rows, means being provided at each filling station to facilitate the loading of the particular row to be filled at that station.

A further object of my invention resides in the provision of a novel fruit pitting and/or slicing machine having a continuously moving fruit supporting conveyor with pitting mechanism designed to move with the conveyor throughout a portion of its movement to pit fruit without halting the movement of the conveyor.

Still a further object of my invention is to provide a novel fruit pitting and/or slicing machine embodying a continuously moving fruit supporting conveyor and pitting and slicing mechanism in synchronized movement therewith so that the operation of the conveyor is continued without interruption and production is maintained at a maximum.

A further object of my invention resides in the provision of a novel support for fruit in a fruit pitting machine wherein novel means is provided to facilitate the loading of fruit on the conveyor and protect the fruit already loaded from contact by the loader.

A further object of my invention is to provide a novel fruit pitting and/or slicing machine having a fruit supporting conveyor with novel means in combination therewith for both pitting and slicing the fruit after it has been pitted without halting the conveyor.

Still a further object of my invention resides in the provision of a novel fruit supporting means including a resilient element having pockets therein to receive the fruit to be pitted, suitable apertures being provided in the pockets through which the fruit may be forced, the resilient character of the supporting surface being an aid in the ejection of the pits from the fruit without damage to the fruit.

A further object of my invention resides in novel fruit pitting means and slicing means in combination with a conveyor whereby the conveyed fruit may be sliced or otherwise cut without injury to the conveying means.

Still a further object of my invention is to provide a novel pitter for use in combination with a fruit pitting machine, the pitter being capable of being readily dismounted, repaired and replaced.

A further object of my invention resides in the provision of a fruit pitting machine embodying means to pit a number of cherries, plums or the like on a continuously moving conveyor without interrupting the progress of the conveyor, thus assuring a maximum production.

A more specific object of my invention is to provide novel pitting means in combination with a conveyor wherein the pitting means moves with the conveyor while pitting and moves at an increased speed in the reversed direction.

With the foregoing and other objects in view, as will appear from the following specification, in connection with the claims, reference is made to the accompanying drawings in which:

*Revolving conveyor or table and associated structure*

With continued reference to the drawings wherein like reference numerals are used to indicate the same parts throughout the several figures of the drawings, the numeral 20 generally indicates a fruit pitting machine made in accordance with and including the several novel features of the present invention.

Machine 20 includes a base plate 21 formed of a metal plate providing a flat upper surface 22 and depending side walls 23 acting as supporting legs. Although base plate 21 may have any suitable configuration, it preferably comprises a central portion 24 having three radially disposed arms 25 spaced at 120° intervals around portion 24. An upright hollow column 26 is secured to portion 24 by means of bolt and nut assemblies 27 which pass through an annular flange 28 formed on column 26.

Column 26 is provided with a bearing portion 29 intermediate its ends and a reduced portion 31 at its upper end. Portion 31 provides a bearing surface 32 terminating in a shoulder 33. A suitable bearing, such as roller bearing 34, is disposed on portion 31 with its inner race in engagement with shoulder 33.

A conveyor in the form of a revolving table 42 provided with a downwardly extending hub 45, integrally formed on central portion 46 of table 42 and suitably reenforced by webs 47, is rotatably mounted on column 26. To this end, the lower end 48 of hub 45 encircles bearing portion 29 of column 26 and prevents undesired tilting of table 42. Suitable antifriction means such as a sleeve 49 is interposed between portion 29 and end 48 to reduce the friction and wear.

Portion 46 of table 42 is provided with a central opening 51 having a suitable bearing receiving shoulder 52 designed to snugly engage outer bearing race 55 of bearing 34. With portion 46 of table 42 mounted on column 26 and bearing members 34 and 49 interposed therebetween, table 42 is supported in such a manner that undue wear between it and column 26 and tilting of table 42 with respect to column 26 is prevented.

Table 42 is provided with a fruit carrying annulus 56 suitably secured thereto. Annulus 56 surrounds portion 46 and is provided with a recess 57 having an outer vertical wall 58 and an inner undercut wall 59. A sectional insert 61 having a sloping wall 62 and a straight wall 63 is provided for insertion in recess 57 with sloping wall 62 in engagement with undercut wall 59. Insert 61 supports the fruit during its passage through machine 20 and will be hereinafter described in detail.

Annulus 56, adjacent its periphery, is provided with a trough-shaped channel 65. Channel 65 is designed to receive fruit from a hopper 66 and carry it past suitable feed stations 67, 68, 69, 70, 71 and 72 provided at spaced points around table 42.

Portions 46 and 56 are preferably joined together through a lap joint 73, a ring gear 74 and machine screws 75. To this end gear 74 spans the meeting edge 76 between portions 46 and 56 and is provided with suitable tapped bores 77 to receive screws 75. Ring gear 74 in addition to securing portions 46 and 56 together serves as the driving gear for table 42 as will be presently described.

Although table 42 is preferably formed in two parts as just described, it is to be understood that table 42 may be made in one piece if desired.

Figure 2:
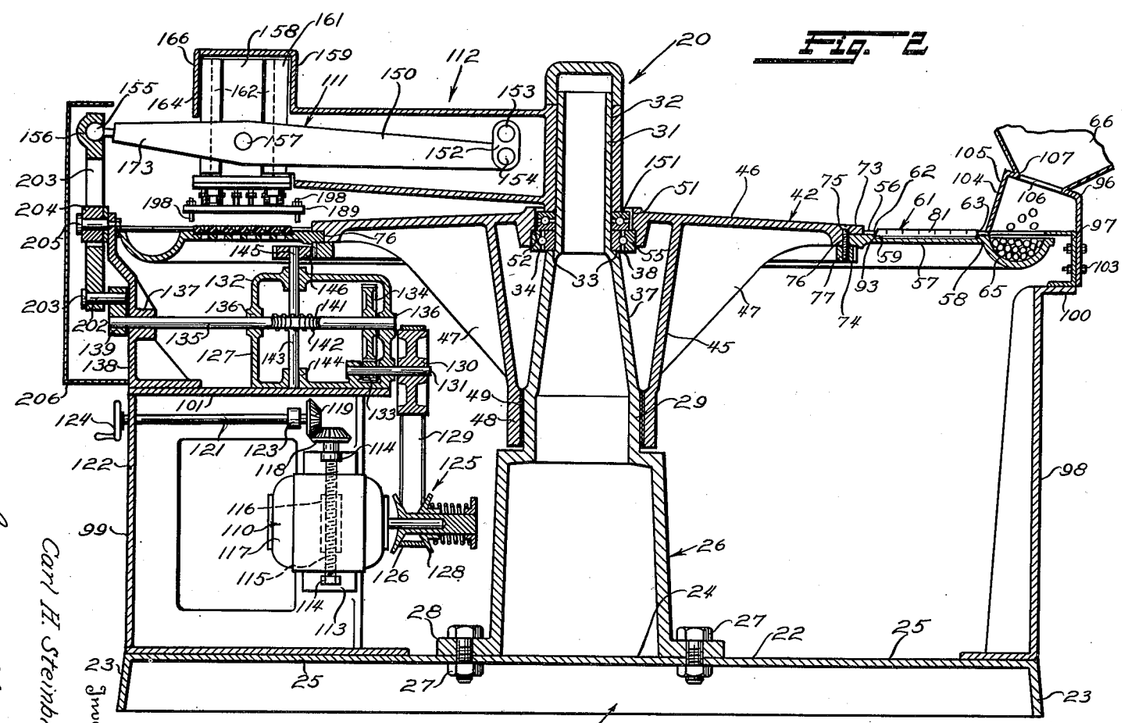
Figure 2 is a section taken on line 2—2 of Figure 1 when viewed in the direction of the arrows.

Insert 61 heretofore mentioned, is preferably made up of a plurality of truncated wedge-shaped elements 81 disposed side by side to form walls 62 and 63 (Figure 2). Elements 81 (Figures 3 and 4) preferably comprise a relatively thin metal base plate 82 of copper, brass or like material having enlarged circular apertures 83 therein. Apertures 83 are disposed in radially spaced relation and correspond in number to the number of rows of fruit intended to be handled by the machine. In the illustrated embodiment of the invention, six apertures 83 centrally located with respect to radial sides 84 of elements 81 are provided. Apertures 83 are designed to cooperate with suitably formed aligned apertures 85 provided in portion 57 of member 56. Apertures 83 and 85 are disposed on a radius of table 42 for a purpose that will presently appear.

One face of plate 82 is provided with a relatively thick layer of resilient non-metallic material 86 such as rubber. Layer 86 is provided with cup-shaped recesses or pockets 87 corresponding in number and position with apertures 83 in plate 82. Layer 86 is preferably vulcanized to plate 82 in any well known manner.

Figure 4:
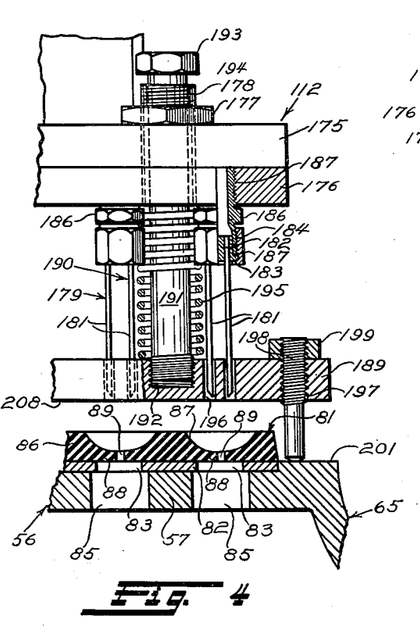
Figure 4 is a detailed fragmental view with certain parts in section showing a pitting mechanism embodying the present invention.

With particular reference to Figure 4, it will be seen that a relatively thin layer of rubber is provided at 88 between apertures 83 and pockets 87. As a consequence portion 88 is readily deformable and due to the use of vulcanized rubber is resilient. Advantage is taken of this inherent characteristic of portion 88 in a manner that will be clearly pointed out. Each pocket 87 is also provided with a relatively small centrally disposed aperture 89. Apertures 89 as viewed in Figure 4 are in axial alignment with apertures 83, 85 and pockets 87.

Eements 81 are inserted in recess 57 in side by side relation to form insert 61. The small ends 91 and the large ends 92 of elements 81, according, define walls 62 and 63. Due to the resilience of material 86 and to the engagement of corner 93 of undercut wall 59 therewith, elements 81 are resiliently and snugly held in recess 57.

Figure 3:
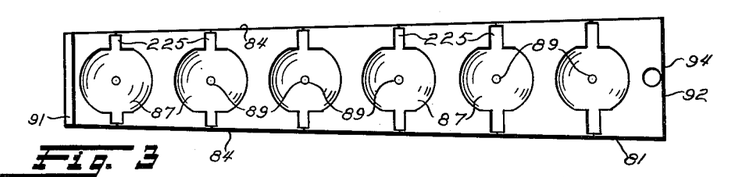
Figure 3 is a plan of a novel fruit receiving element embodying the present invention.

While elements 81 are satisfactorily retained in recess 57 as pointed out above, it has been found desirable to provide apertures 94 adjacent ends 92 of elements 81 as shown in Figure 3. These apertures are designed to receive suitable machine screws (not shown) which are threaded into suitably tapped bores (not shown) in recess 57. Elements 81 are thus positively retained in recess 57 by undercut wall 59 at one end and machine screws at the other end.

In order to protect the attendants from danger from rotating table 42, the present invention contemplates the provision of a ring-like member 96 composed of a generally U-shaped metal channel member 97 which is supported on legs 98 and 99 secured in place on arms 25 of base plate 21. Member 97 is shaped to surround the outer peripheral rim of table 42. Member 97 is supported upon and secured to horizontally extending flanges 100 formed on legs 98 and by plate 101 secured to leg 99.

Member 97 adjacent leg 99 is separated to provide a space 102 and is suitably apertured at another point to receive nut and bolt assemblies 103 designed to secure an inverted substantially U-shaped member 104 in place thereon. One leg 105 of member 104 extends into close proximity to portion 56 of table 42 as seen in Figure 2. Member 104 serves as a support for a hopper 66 and also prevents the fruit from falling onto portion 56 of table 42. A suitable aperture 106 in member 104 permits the passage of fruit from mouth 107 of hopper 66 to trough 65 in a manner that will be clear from an inspection of Figure 2.

Figure 1:
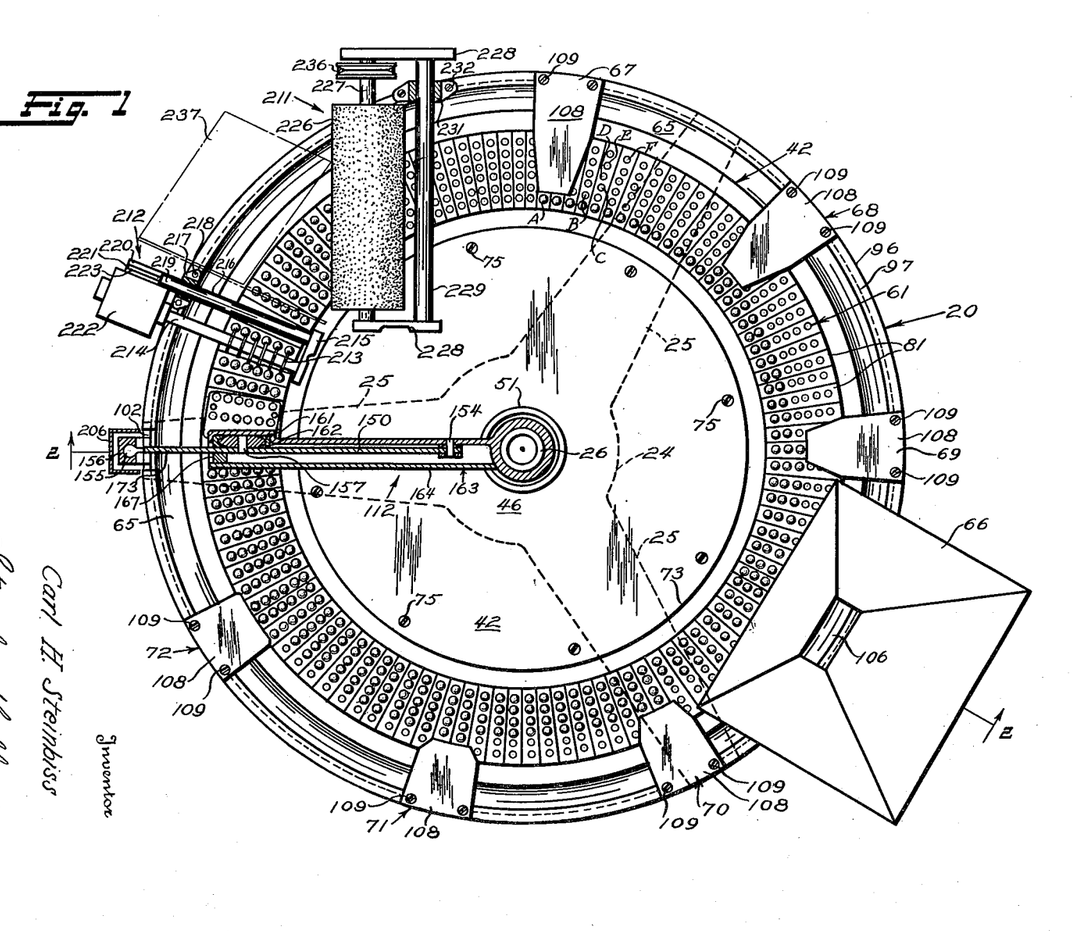
Figure 1 is a plan view of a fruit pitting machine made in accordance with the present invention.

Member 97 at each of stations 67 to 72 is provided with an arm rest and row indicator in the form of a plate 108 connected to member 97 by means of machine screws 109. Plates 108, as shown in Figure 1, extend inwardly from member 97 and are disposed above portion 56 of table 42. The space between plates 108 and the table is preferably sufficient to permit fruit in pockets 87 to freely pass beneath plates 108. These plates, furthermore, extend variable distances in from the rim of table 42 and terminate adjacent different circular rows of pockets 87 to form row indicators. For example, plate 108 at station 67 extends inwardly to the inner circular row A, and plate 108 at station 68 extends inwardly to the next adjacent circular row B. Each row A, B, C, D, E, and F is provided with indicators in this manner. Members 108 also serve as arm rests for attendants located at stations 67 to 72. These attendants place the fruit in pockets 87 in accordance with indicator plates 108. It will be noted that the plates are so positioned that in placing the fruit, attendants will not bruise or disturb the fruit already placed.

*Power source and table drive*

A suitable source of power such as an electric motor 110 is provided for driving table 42, and operating the pitting mechanism 111 and an oscillating supporting arm 112 arranged to support mechanism 111. Motor 110 is mounted on leg 99 in such a manner that it may be moved bodily in a vertical direction for a purpose to be presently described. This mounting comprises a plate 113 secured to leg 99 and provided with suitable bearing members 114 adapted to rotatably receive a threaded shaft 115. Shaft 115 is threaded into a tapped sleeve-like member 116 suitably secured to casing 117 of motor 110 so as to suspend motor 110 on shaft 115. The upper end of shaft 115 is provided with a bevel gear 118 designed to operatively engage a complemental bevel gear 119 carried on the end of a shaft 121. Shaft 121 is rotatably supported in front flange 122 of leg 99 and a suitable bearing member 123 secured on leg 99. A suitable hand wheel 124 is secured to the protruding end of shaft 121 to enable an attendant to rotate shaft 121 and through gears 118 and 119 cause rotation of shaft 115 to raise or lower motor 110 through the mating threads of shaft 115 and member 116 in a manner that will be readily understood.

A suitable drive connection 125 of the variable speed type connects motor shaft 126 to a power take-off and speed reduction transmission 127. Drive connection 125 preferably takes the form of a belt drive including a variable speed drive pulley 128, a drive belt 129 and a driven pulley 130 carried by a shaft 131 supported in casing 132 housing transmission 127.

Shaft 131 is provided with a pinion 133 which engages a gear 134 secured to a main power take-off shaft 135, supported in bearings 136 in casing 132. Gear 134 is disposed adjacent one end of shaft 135.

Shaft 135 is driven at a reduced speed from shaft 131 by means of pinion 133 and gear 134. Shaft 135 extending through and supported in a bearing member 137 formed on member 138 mounted in space 102 and secured to plate 101, is provided with a crank arm 139. Arm 139 is adapted to operate arm 112 and pitting mechanism 111 in a manner to be hereinafter described.

Shaft 135, intermediate gear 134 and crank arm 139, is provided with a worm 141 adapted to operatively engage a worm gear 142 carried by an auxiliary power take-off shaft 143 supported in bearings 144 formed in casing 132. Protruding end 145 of shaft 143 is provided with a pinion 146 which is adapted to engage ring gear 74 secured to the underside of table 42. As a consequence, table 42 is driven by power take-off shaft 143. Due to the illustrated gear arrangements, 141, 142, 74 and 146, table 42 rotates at a constant speed and considerably slower than power take-off shaft 135.

*Manner of supplying fruit to table*

Assuming that motor 110 is connected to a suitable source of electrical energy and turned on, table 42, will be rotated, in a clock-wise direction as seen in Figure 1, at a relatively slow speed through drive connection 125, gears 133 and 134, shaft 135, gears 141 and 142, shaft 143 and gears 146 and 74. An attendant maintains hopper 66 full of fruit such as cherries. The cherries pass by gravity through mouth 107 of hopper 66 and are deposited in trough-shaped extension 65 which passes beneath mouth 107. When the cherries in channel 65 reach the attendant at station 67, he removes a handful with one hand and with his arms on plate 108 as a rest, he deposits a cherry in each pocket 87 of the inner row of pockets which is the row to be filled by him as indicated by the end of plate 108.

The cherries, in order to obtain a high quality product, are preferably placed with their stem ends down so that each pit is disposed with its major axis in substantial vertical alignment with respect to apertures 83, 85 and 89 formed in inserts 61 and annulus 57 of table 42. As the table 42 continues to rotate, unfilled pockets 87 are constantly presented at station 67 for filling.

Shortly after the attendant at station 67 begins filling pockets 87 of the inner row A of pockets, the cherries in extension 65 due to the rotation of table 42, reach the attendant at station 68. This attendant picks a handful of cherries from channel 65 and starts filling the next adjacent row B of pockets 87 as indicated by plate 108 at station 68. This same procedure is followed by the attendants at stations 69, 70, 71 and 72 which are successively reached as table 42 rotates.

After the attendant at station 72 has filled the pockets 87 which have passed station 72, all of the several rows of pockets within the area between station 72 and arm 112 are filled and the cherries are ready to be pitted by pitting mechanism 111 carried by arm 112.

Although it is preferable to fill the rows of pockets beginning with the inner row and working outwardly, it is to be understood that rests and indicators 108 may be arranged so as to fill the rows from the outer row inwardly. In such case the filled rows will be protected from accidental contact with the arms of attendants at succeeding stations by plates 108.

While any suitable type of pitting mechanism capable of forcing the pits out of the stem ends of the cherries may be used, the present invention contemplates a novel pitting mechanism peculiarly adapted for use with a machine of this type.

*Pitting mechanism and operating means therefor*

Pitting mechanism 111, embodying the present invention, comprises a rocker arm 150 secured at one end to arm 112 which is in turn pivotally mounted on portion 31 of column 26. A suitable antifriction bearing 151 freely disposed in aperture 51 of table 42 spaces arm 112 from table 42 and permits independent operation of table 42 and arm 112.

A short bifurcated link 152 connected to arm 112 by a pin 153 and to one end of rocker arm 150 by a pin 154 interconnects arms 112 and 150 and permits relative radial movement of arm 150 with respect to arm 112. The other end of rocker arm 150 is connected through a ball and socket joint 155 to a drive element 156. Arm 150, intermediate its ends and near joint 155, is pivotally connected by a pin 157 to a slide member 158 slidably mounted in enlarged portion 159 of arm 112. Suitable guide elements 161 having V-shaped guide slots 162 therein are secured in portion 159 of arm 112 and confine the sliding movement of member 158 to a vertical path.

Figure 5:
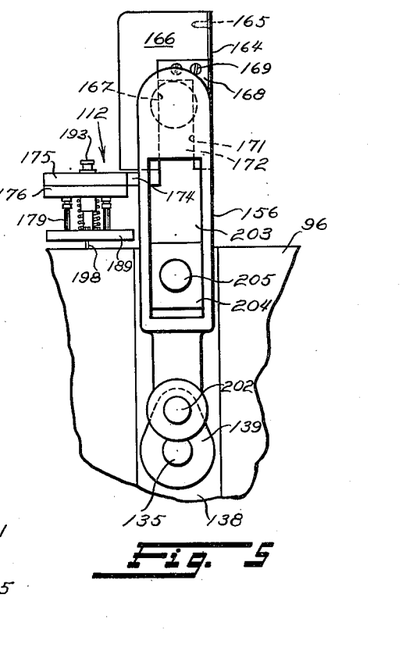
Figure 5 is a fragmental elevation of the arm carrying pitting elements of the present invention and showing drive means for imparting the desired movements to the arm and the pitting elements.

Face 163 of arm 112 is preferably open to permit the assembly of arm 150, slide member 158 and guides 161 and is closed by a removable closure plate 164 secured to arm 112 by screws 165. Closed end 166 of portion 159 is notched at 167 (Figure 5) to receive an inverted L-shaped closure plate 168. Plate 168 is secured in notch 167 by suitable screws 169 and is notched at 171 so as to cooperate with notch 167 and form an opening 172 through which end 173 of arm 150 extends.

The lower end 174 of member 158 is disposed at right angles to the main portion thereof to form a horizontal head or supporting platform 175. Head 175 is disposed at a slight angle to arm 112 so as to align it with respect to a radius of table 42. A tool carrier 176 is secured to head 175 by means of nuts 177 threaded on hollow threaded elements 178 suitably secured to carrier 176. Tool carrier 176 is provided with a plurality of pitting elements 179 arranged in two radial rows.

Elements 179 preferably take the form of grouped needle-like members 181 suitably secured to a cylindrical head 182. Members 181 are disposed on a circle, the diameter of which is preferably slightly less than that of the pit in the fruit. Head 182 at its lower edge is provided with a shoulder 183 and is inserted in a suitable nut 184 having a mating shoulder 185 for receiving shoulder 183. Nut 184 is threaded on a nipple 186, the lower end 187 of which abuts shoulder 183 and clamps it against shoulder 185 of nut 184 to rigidly secure head 182 and members 181 to nipple 186. Nipple 186 is then threaded into suitably tapped apertures 187' formed in tool carrier 176. Apertures 187 are aligned with apertures 188 in head 175 and are disposed on a radius of table 42 in alignment with the circular rows of pockets 87 in member 61.

A combined guide and stripper plate 189 is secured below carrier 176 by a lost motion connection 190. To this end, plate 189 is provided with relatively long bolt-like elements 191 freely received within sleeves 178 and threaded into suitably tapped bores 192 in plate 189. Heads 193 of elements 191 normally rest on ends 194 of sleeves 178. Sleeve 178 and coil springs 195 encircle elements 191, the opposite ends of said springs engaging plate 189 and carrier 176. As a consequence, plate 189 is yieldingly retained in spaced relation to head 175 and tool carrier 176. Plate 189 is provided with apertures 196 which are aligned with members 181 and serve to guide these members as they reciprocate to remove pits from the fruit. At its ends plate 189 is suitably tapped at 197 to receive spacer bolts 198 which are locked in place by nuts 199. Bolts 198 rest on smooth surfaces 201 provided on table 42 and serve to adjustably position plate 189 above table 42 and the fruit in pockets 87. Due to the adjustability of plate 189, fruits of varying size may be pitted in machine 20 without danger of the fruit adhering to members 181 and being removed from their proper position in pockets 87.

Drive elements 156, provided for operating pitting mechanism 111, is connected to arm 150 as previously pointed out and to crank arm 139 by means of crank pin 202. Member 156 intermediate its points of connection 155 and 202 is provided with a rectangular slot 203 adapted to receive a bearing guide member 204 pivoted on a pin 205 secured to member 138. Accordingly, as crank arm 139 is rotated by shaft 135, drive element 156 pivots around pin 205 and slides with respect to member 204 imparting both an oscillating and reciprocating motion to mechanism 111. A suitable housing 206 is provided to enclose member 156 and protect the attendants from injury by contact with the mechanisms.

Mechanism 111, therefore, moves in a generally elliptical path, oscillating around column 26 due to the pivotal connection of arm 112 and reciprocating in a vertical direction due to guides 161. This movement of mechanism 111 causes the two rows of pitting elements 179 to move into alignment with adjacent radial rows of pockets 87 and downwardly into the fruit in pockets 87 while the table 42 and elements 179 are moving as a unit in a clockwise direction. Pits 207 are therefore removed without injuring the fruit in the manner illustrated in Figure 6 and without halting the table.

Figure 6:
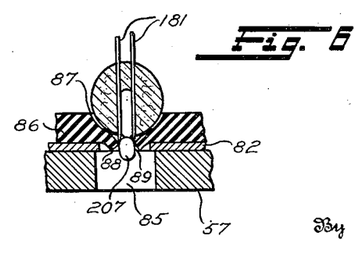
Figure 6 is a fragment in partial section showing a pit being removed from a cherry by a machine embodying the present invention.

Referring to Figure 6, elements 181 enter the cherries and engage pits 207 at their inner ends. The downward movement of mechanism 111 carries plate 189 downward until bolts 198 contact portions 201 of table 42. After bolts 198 are in contact with portions 201, further downward movement of mechanism 111 moves elements 181 through apertures 196 into the fruit and forces pits 207 out through the stem ends of the cherries and through apertures 89 in elements 81. As pits 207 pass through apertures 89, portions 87 of resilient material 86 are forced downwardly stretching apertures 89 and permitting pits 207 to pass therethrough.

After the largest diameter of pits 207 passes through apertures 89, elements 181 begin their upward movement and become disengaged from pits 207. The resiliency of portions 86 of elements 81 then causes apertures 89 to shrink and squeeze pits 207. Since pits 207 are tapered toward their ends, this squeezing action of apertures 89 ejects pits 207 into a suitable container disposed beneath table 42. As a consequence, pits 207 are automatically ejected from apertures 89 and do not adhere to the underside thereof.

After removal of pits 207, mechanism 111 moves upwardly and in the direction of rotation of table 42 to withdraw elements 181 from the fruit. Should any of the pitted fruit adhere to elements 181 during this upward movement, it will engage surface 208 of stripper plate 189 which during the initial upward movement of mechanism 111 is held against table 42. The fruit adhering to elements 181 is, accordingly, stripped from elements 181 and returned to pockets 87. Since the distance between the fruit and surface 208 is relatively small, the fruit will fall into pockets 87 with their stem ends downward. After elements 181 are withdrawn into apertures 196, sleeve 178 contacts head 193 of bolts 191 and plate 189 moves upwardly with head 175 and carrier 176. After elements 181 are thus disengaged from the fruit, mechanism 111 moves upwardly and in a direction opposite to the rotation of table 42 to its starting position. Accordingly mechanism 111 is positioned to repeat the cycle of operation just outlined.

Due to the transmission 127 and member 156, mechanism 111, during the pitting operation, travels at the same speed and in the direction of rotation of table 42, and after the pitting operation travels at an increased speed in the direction opposite that of table 42 to its starting position.

After pits 207 are removed, table 42 carries the pitted cherries to a discharge mechanism 211 or if halved cherries are desired, to a slicing mechanism 212.

Slicing mechanism

Slicing mechanism 212 may take any desired form but preferably comprises a plurality of revolving slicing blades 213 aligned with the circular rows of cherries and carried by a shaft 214 disposed above and radially with respect to table 42. Shaft 214 is supported at one end by a member 215 carried by a parallel shaft 216 supported in a bracket 217 secured to member 97 by suitable screws 218. End 219 of shaft 216 protrudes beyond bracket 217 and is provided with a supporting member 220 having a flat plate-like portion 221 formed thereon. A suitable electric motor 222 having a plate 223 thereon is secured to plate 221. Shaft 214 is connected to motor 222 in any suitable manner or may constitute the motor shaft as shown in Figure 1.

Figures 7, 8, 9, 10:
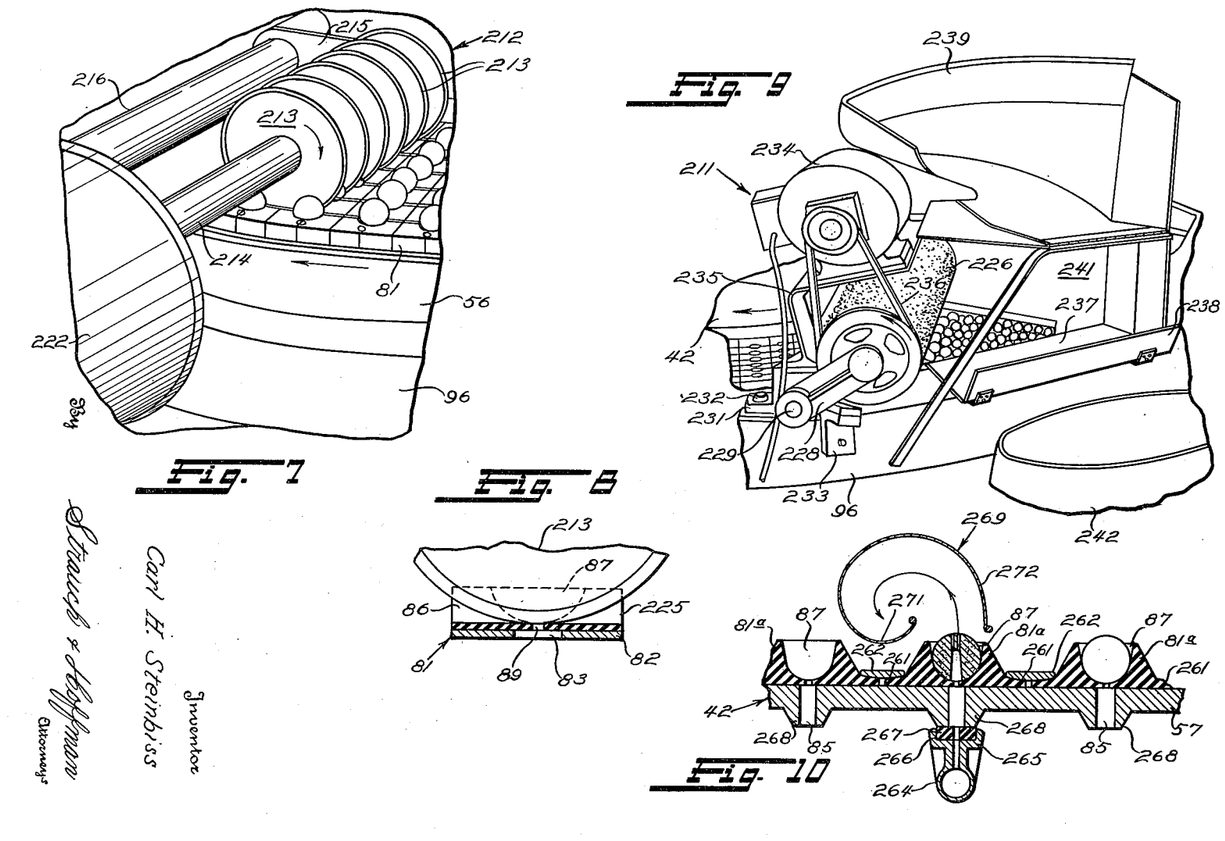
Figure 7 is a fragmental perspective showing the manner in which the slicing device of the present invention cooperates with the conveyor of the pitting machine.
Figure 8 is a fragmental view partially in section showing the manner in which the blades of the slicing device of Figure 7 cooperate with the fruit receiving elements illustrated in Figures 3 and 4.
Figure 9 is a perspective of a preferred fruit discharging mechanism and chute of the present invention.
Figure 10 is a section through the fruit conveyor illustrating a modified form of fruit receiving and discharging means.

Motor 222 drives shaft 214 at high speed preferably in a clockwise direction to cut the cherries in half. Blades 213 are adapted to be freely received in slots 225 provided in material 86 of elements 81 (Figures 3 and 8). As a consequence, the cherries are completely severed without in any way injuring material 86.

In the event that whole cherries are desired, members 215 and 220 may be loosened and shaft 214 and motor 222 raised from their operative position. The cherries will then pass beneath blades 213 without being cut.

Discharge mechanism

A preferred form of discharge mechanism 211 comprises a rotary brush 226 carried by a shaft 227 supported in members 228. Members 228 are adjustably fastened to a shaft 229 supported in bracket 231 secured to member 97 by suitable screws 232 and bracket 233. As a consequence, members 228 may be adjusted to vary the bearing extent of brush 226 on table 42.

A suitable electric motor 234 carried by a bracket 235 secured on shaft 229 and the adjacent portion of the machine drives brush 226 in a counter-clockwise direction at high speed through a belt and pulley drive 236. Rotation of brush 226 sweeps the cherries from pockets 87 to a discharge chute 237 carried by rim 96.

Chute 237 as shown in Figure 9 has a hinged portion 238 which may be raised as shown in Figure 9 to prevent cherries from being discharged from the machine. A suitable hood 239 and a housing 241 prevent the cherries from being swept back along table 42 or beyond a receiving container 242 provided to receive the pitted cherries. Hood 239 is hinged to housing 241 so that it may be raised to the position shown in Figure 9 to permit removal of container 242 when it has been filled. After filled container 242 has been replaced by an empty container, hood 239 and portion 238 of chute 237 are lowered and the cherries are swept into the empty container 242 in a manner that will be obvious from the drawings.

It is believed that the operation of machine 20 will be clearly understood from the preceding description and as a consequence a detailed description of the operation will be omitted. It is to be noted however, that machine 20 provides a continuously operating commercial pitting machine wherein the pits are removed without damaging the natural appearance of the fruit and wherein the only manual labor required is in the placing of the fruit in pockets 87, the filling of hopper 66 and the removal of container 242 and the pit receiving container.

*Modification of pockets and discharge mechanism*

Figure 10 illustrates a further preferred modification of the fruit pockets and discharge mechanism. In this form of the invention, pockets 87 are formed by individual rubber members 81a which are provided with flanges 261 completely surrounding members 81a. Members 81a are preferably disposed with their edges in engagement. Strips 262 of metal are disposed between each radial row of pockets 87 and on flanges 261 of members 81a. Strips 262 are bolted to table portion 57 in any suitable manner, thus securing members 81a in place upon annulus 57 in a manner that will be clear from an inspection of Figure 10.

In lieu of brush 26, this form of the invention provides a compressed air discharge device comprising a compressed air conduit 264 connected in any suitable manner to a suitable source of air under pressure. Conduit 264 is provided with a nozzle portion 265 having a recess 266 therein in which a sealing member 267 of rubber or like material is positioned. Member 267 is designed to tightly engage suitable bosses 268 formed on table 42 to form an air tight connection between nozzle 265 and bosses 268. Any suitable mechanism may be utilized to bring nozzles 265 into operative relation to bosses 268 and to operate the air blast in synchronism with the movement of the conveyor. Nozzles 265 are preferably arranged on a radius of the conveyor and correspond in number to the circular rows of pockets provided by machine 20. A suitable chute 269 having a channel 271 and an elongated curved extension 272 is supported in any suitable manner above the discharge zone of table 42.

In operation, nozzles 265 are brought into engagement with bosses 268 and compressed air is discharged from nozzles 265 through passages 85 in table 42 and into the cavity left in the cherries by removal of the pit 207. Since this cavity is practically air tight due to the needle-like cuts in the cherry, the cherries will be ejected from pockets 87 against extension 272 of chute 269 with sufficient force to cause the cherries to follow extension 272 and drop into channel 271. The cherry then passes through channel 271, which is preferably slanted, to a suitable point of discharge under the force of gravity or if desired due to air directed longitudinal of channel 271.

Suitable cams or eccentric mechanism may be provided for engaging the air nozzles with bosses 268 at intervals corresponding to the movement of the conveyor. Likewise, the conveyor may be provided with a cam or like trip mechanism to open the air valve to the nozzles 266 when it is desired to discharge the fruit.

While the conveyor herein illustrated is of the circular type, it is to be understood that it may be constructed to move in a generally rectangular or elliptical path or may be constructed as an endless belt supported by spaced pulleys, the pitting run being disposed above the return run. Likewise the number of rows of pitting elements employed may be varied as desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fruit pitting machine comprising a conveyor adapted to be continuously moved and having pockets for receiving fruit to be pitted, means for pitting said fruit, a fruit receiving chamber extending along the outer edge of said conveyor and moving with said conveyor, guard means extending along the edge of said conveyor, and plate means connected to said guard means at predetermined points and projecting over said chamber and said conveyor, said plates providing stations for manual loading of the pockets of said conveyor.

2. The combination defined in claim 1 wherein said pockets are arranged in a plurality of series on said conveyor and said loading stations extend different distances across said conveyor to indicate the particular series of pockets to be filled at each loading station.

3. A conveyor for use in a fruit pitting machine comprising a rigid table member having a circumferential recessed portion formed with a plurality of aligned apertures, a series of like resilient, contiguous body members each having a plurality of fruit receiving pockets disposed side by side in said recessed portion with said pockets in alignment with said apertures each of said pockets having a relatively small aperture at its bottom, said resilient body members being individually removable to facilitate assembly and repair.

4. A pitting mechanism for use in a fruit pitting machine comprising an oscillatable supporting member, a rocker arm mounted on said supporting member, a slide on said supporting member connected to said rocker arm, a head on said slide, a plurality of pitting members mounted on said head, guiding and stripping means on said head, and means for operating said rocker arm to rock said arm and oscillate said supporting member.

5. In a fruit pitting apparatus, a substantially annular conveyor having a surface travelling in a substantially planar path and having a plurality of series of pockets therein for receiving fruits to be pitted, a fruit receiving chamber extending along the outer edge of said conveyor, means for supplying fruit to said chamber, and means providing filling stations spaced along the conveyor adjacent said chamber, each filling station comprising means extending across said chamber and generally radially of said conveyor surface for positioning and guiding an attendant whose function is to manually transfer fruit from said chamber to said pockets.

6. In fruit pitting apparatus, a generally circular conveyor having a generally flat apertured top surface portion rotatable about a substantially vertical axis, a support upon which said conveyor is rotatably mounted, a plurality of radially spaced rows of fruit receiving pockets arranged at the surface of said conveyor, a spindle rigid with said support extending through said apertured top surface an oscillatable arm supported for rotation upon said spindle and extending over said conveyor, fruit pitting means slidable in a substantially vertical guide on said arm, and means for continuously driving said conveyor and operating said fruit pitting means in synchronism with said conveyor to pit the fruits on said conveyor without interrupting the rotation thereof.

7. In fruit pitting apparatus, an oscillatable arm, reciprocable slide means carrying a fruit pitting device, a guide for said slide means on said arm, a rocker arm pivotally connected to said slide means, and means connected to said rocker arm for reciprocating said slide means and oscillating said arm in synchronism.

8. In the fruit pitting apparatus of claim 7, said rocker arm being also pivotally connected directly to said oscillatable arm.

9. Fruit pitting apparatus comprising a fruit pitting station, an apertured conveyor, a plurality of rows of fruit receiving pockets secured to said conveyor, each of said pockets comprising an integral resilient member having a generally cup-shaped depression at the bottom of which is a relatively small aperture, means for continuously moving said conveyor past said station so that the fruit in said pockets travels substantially in a plane past said station, an oscillatable arm extending over said conveyor and carrying a fruit pitting head which is slidable in a plane generally normal to the plane of travel of said fruit, means for oscillating said arm to cause it to travel with the conveyor as the conveyor is moved past said station, and means for operating said pitting head to pit fruit in said pockets while said arm and conveyor are so travelling.

10. Fruit pitting apparatus comprising apertured, substantially annular rotary means for simultaneously moving and supporting a succession of carriers having circumferentially and radially aligned pockets for receiving and positioning the fruit to be pitted, each of said carriers including a resilient member having a cup-shaped depression at the bottom of which is a relatively small aperture, means for continuously driving said rotary means, a guideway distinct from said rotary means mounted to oscillate about an axis of said rotary means, a knife holder reciprocably mounted in said guideway, means for reciprocating said knife holder, means for moving said knife holder and rotary means together with the knife holder in alignment with a specific carrier during a predetermined arc of rotation, means for operating said knife holder to pit the fruit on said aligned carrier during said arc of rotation, and means for oscillating said knife holder back into alignment with a succeeding carrier.

11. A conveyor for use in a fruit pitting machine comprising a rotatable member having a substantially annular recess adjacent its outer edge and a plurality of aligned apertures at the bottom of said recess, a plurality of generally radially extending resilient pocket members lying side by side in said recess and provided with apertured pockets aligned with said apertures, each of said members having opposite side walls extending generally radially of said annular recess and being of generally truncated wedge-shape with its larger end adjacent the outer edge of said recess.

12. In the conveyor recited in claim 11, the inner edge of said recess being undercut, and an inclined wall at the smaller inner end of each of said members fitting into said undercut edge.

13. A fruit pitting mechanism comprising a succession of carriers movable at a substantially constant rate of advance over a path including a substantially horizontal portion of substantial length; pitting mechanism mounted over said carriers and above said horizontal portion and movable to engage and pit fruit on said carriers; a generally vertical guideway supported to move to and fro above said horizontal portion over a path parallel to that of said carriers; said pitting mechanism being slidably mounted in said guideway, means for advancing said guideway in the direction of advance of said carriers at the same rate of advance over a portion of said path to maintain said pitting mechanism for a predetermined time interval superimposed over a carrier, and means for lowering said pitting mechanism during said interval to engage and pit fruit on said carrier and for raising said pitting mechanism from engagement with said fruit.

CARL H. STEINBISS.